United States Patent [19]

Marsoner

[11] 4,366,402

[45] Dec. 28, 1982

[54] CYLINDRICAL CAPACITIVE TACHOGENERATOR

[75] Inventor: Günter Marsoner, Vienna, Austria

[73] Assignee: U.S. Philips Corporation, New York, N.Y.

[21] Appl. No.: 216,109

[22] Filed: Dec. 15, 1980

[30] Foreign Application Priority Data

Jan. 22, 1980 [AT] Austria ................................ 331/80

[51] Int. Cl.³ .................................................. G01P 3/48
[52] U.S. Cl. ................................. 310/68 B; 310/168; 310/178; 361/289; 361/292
[58] Field of Search ...................... 310/68 B, 156, 168, 310/178, 43, 308, 309; 361/289, 278, 292; 332/24 C; 324/166

[56] References Cited

U.S. PATENT DOCUMENTS

| | | | |
|---|---|---|---|
| 2,805,677 | 9/1957 | Baird | 310/168 |
| 3,147,374 | 9/1964 | Diamond | 361/292 |
| 3,729,728 | 4/1973 | Hardway, Jr. | 324/166 |
| 3,886,385 | 5/1975 | Bacchialoni | 310/178 |
| 3,950,679 | 4/1976 | Boeren | 361/289 |
| 4,185,215 | 1/1980 | Montagu | 310/156 |

FOREIGN PATENT DOCUMENTS 1210217 2/1966 Fed. Rep. of Germany.
2120671 11/1972 Fed. Rep. of Germany.

*Primary Examiner*—J. D. Miller
*Assistant Examiner*—D. L. Rebsch
*Attorney, Agent, or Firm*—David R. Treacy

[57] ABSTRACT

A cylindrical capacitive tachometer generator having a rotor and a stator, and a cylindrical air gap between facing cylindrical surfaces of the rotor and stator, each provided with equal numbers of teeth uniformly distributed over the circumference and spaced from each other by tooth gaps, the effective capacitive width of a tooth on one cylinder surface being smaller than the effective capacitive width of a tooth or of a tooth gap on the other cylinder surface.

4 Claims, 3 Drawing Figures

CYLINDRICAL CAPACITIVE TACHOGENERATOR

The invention relates to a cylindrical capacitive tachogenerator comprising a rotor and a stator, one of which takes the form of an inner cylinder and the other of a coaxial hollow outer cylinder, which two cylinders, between the facing cylinder surfaces of which an air gap is formed, are each provided with equal numbers of teeth, which are spaced from each other by tooth gaps and which are uniformly distributed around the circumference, the ratio of the effective capacitive width of a tooth at its free end to the effective capacitive width of an adjacent tooth gap at the same circumferential level having a predetermined value. Such a tachogenerator is for example described in DE-AS No. 12 10 217. In this known tachogenerator the teeth are comparatively wide and the tooth gaps are comparatively narrow, so that in this case the ratio of the effective capacitive width of a tooth to the effective capacitive width of an adjacent tooth gap is approximately 1:0.12. Such a tachogenerator supplies a pulse-shaped output signal. Herein, the effective capacitive width of a tooth or a tooth gap is to be understood to mean a value which, in the case of a rounding or bevelling of those tooth edges at the free tooth ends which extend transversely of the direction of movement of the rotor, is an average value in respect of the effective air gap between stator and rotor, which will be discussed in more detail hereinafter.

It is the object of the invention to construct a tachogenerator of the type mentioned in the opening paragraph so that it supplies an optimally sinusoidal output signal of maximum amplitude, because in order to evaluate the output signal of such a tachogenerator it is frequently desirable that a sinusoidal signal is available. To this end, the invention is characterized in that the effective capacitive width of a tooth on one cylinder surface is smaller than each of the effective capacitive widths of a tooth and of a tooth gap on the other cylinder surface. In this way it is achieved that, if the teeth of the rotor pass along the teeth or tooth gaps of the stator, each time two positions are obtained in which on the one hand only two teeth are completely in line and on the other hand only one tooth is completely in line with a tooth gap, without the possibility of a tooth bridging a tooth gap. Thus, two entirely different capacitive values are obtained in these two extreme positions, depending on whether two teeth are in line or one tooth is in line with a tooth gap, which with the corresponding intermediate capacitive values in the other positions of the rotor relative to the stator results in the tachogenerator supplying a substantially sinusoidal signal of comparatively high amplitude.

Tests have revealed that the output signal of the tachogenerator closely approximates a sinewave, if the ratio of the effective capacitive width of a tooth to the effective capacitive width of an adjacent tooth gap is selected to be of the order of magnitude of 1:1 on one cylinder surface and is selected between 1:2 and 1:4 on the other cylinder surface. Here, order of magnitude is to be understood to mean deviations from the ratio 1:1, which may range up to ±40%. In this respect it is found to be particularly advantageous if the ratio is selected to be 1:1±10% on the one cylinder surface and 1:3±10% on the other cylinder surface. When such ratios are selected an optimum output signal of the tachogenerator is obtained.

As is customary, the two cylinders of such a tachogenerator may be manufactured from an electrically conductive material, for example steel, in order to obtain the appropriate capacitive effect. As the teeth or toothing gaps should be formed very accurately in respect of their shape and dimensions, this demands a grinding process which is comparatively intricate and expensive. In respect of a particularly simple manufacturing process of such a tachogenerator, it is therefore found to be advantageous if the two cylinders with the teeth arranged on them take the form of plastics parts, whose surfaces are at least partly provided with an electrically conductive layer. In this way the two cylinders can be manufactured comparatively simply and accurately by injection-moulding techniques, the required capacitive properties being realized by means of electrically conductive layers. Such conductive layers may for example be obtained in a simple manner by electro-plating, the teeth and tooth gaps being accurately in line with each other.

The invention will be described in more detail hereinafter with reference to the drawing, which shows a non-limiting embodiment of the invention.

Figure 1:
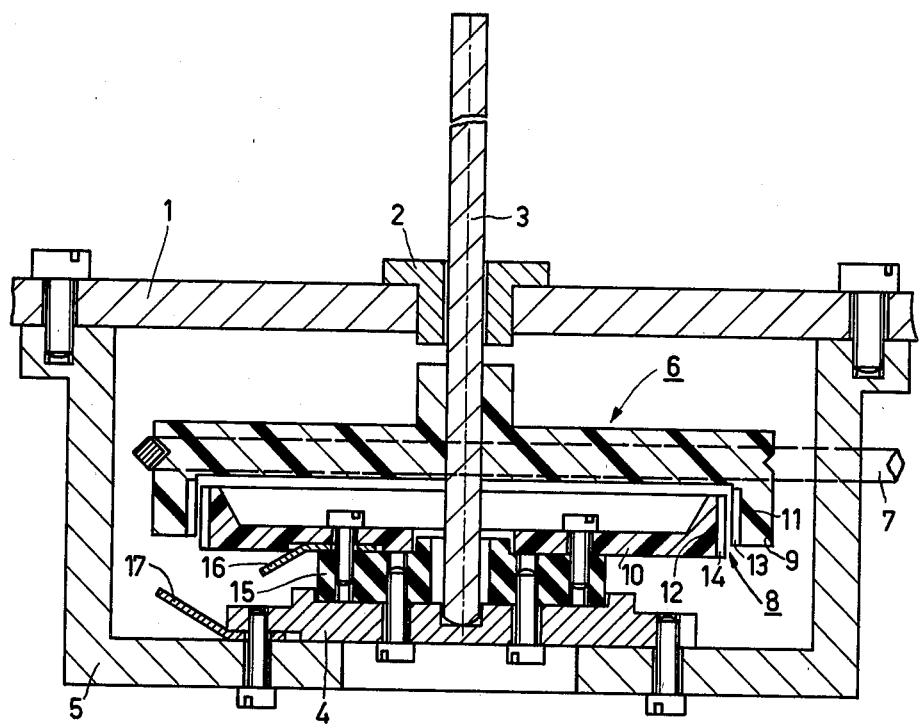
FIG. 1 is a cross-sectional view of a cylindrical capacitive tachogenerator, which is connected to the capstan of a recording and/or reproducing apparatus for a record carrier in the form of a tape.

In FIG. 1 the chassis of a recording and/or reproducing apparatus is designated 1, which chassis carries a bearing bush 2, in which a capstan for the transport of a record carrier in the form of a tape, not shown, is journalled for rotation. The capstan 3 is axially supported, in the customary manner, by a thrust bearing 4, which is mounted on a U-shaped bracket 5, which is secured to the chassis 1. As is customary in such apparatus, a flywheel 6 is connected to the capstan 3, which is drivable by a motor via a belt 7.

Since the drive of such a capstan should generally meet very stringent requirements in respect fo accuracy, this is frequently achieved with the aid of a servo-control. Such a servo-control derives a control signal by the comparison of a reference signal and a measuring signal, which control signal is for example applied to the drive motor. In order to obtain such a reference signal, there are generally provided tachogenerators, which are operatively connected to the part to be driven. In the present case a cylindrical capacitive tachogenerator 8 is connected to the capstan 3. Obviously, such a tachogenerator may also be employed in conjunction with other drive mechanisms, such as for example for driving a turntable of a recording and/or reproducing apparatus or, in general, for any part which is driven in a rotary fashion. Such tachogenerators may for example also be employed for merely deriving a signal which is characteristic of the rotation of a part. Because of their comparatively simple construction use is frequently made of cylindrical capacitive tachogenerators for this purpose. The present invention relates to the construction of such a cylindrical capacitive tachogenerator.

Such a cylindrical capacitive tachogenerator comprises a rotor 9 and a stator 10, the rotor being connected to the rotary part. The rotor and the stator then either take the form of an inner cylinder or a coaxial hollow outer cylinder, which of the two cylinders functions as rotor or as stator being irrelevant. In the present embodiment the stator 10 takes the form of an inner cylinder and the rotor 9 of a coaxial hollow outer cylinder, the latter being arranged directly on the flywheel 6 and being integral therewith. On the facing cylinder surfaces 11 and 12 the two respective cylinders 9 and 10 which are made of an electrically conductive material such as for example steel, each have an equal number of teeth 13 and 14 respectively, which are spaced by tooth gaps and are uniformly distributed over the circumference, an air gap being formed between said cylinders. In this way the rotor 9 and the stator 10 constitute a capacitor, whose capacitance changes depend on the position of the rotor teeth relative to the stator teeth, namely depend on whether two teeth face each other or a tooth faces a tooth gap, or in accordance with the intermediate positions. If a signal, either a direct voltage or an alternating voltage, is applied to such a capacitor with a periodically variable capacitance, the amplitude of said signal will vary in accordance with the instantaneous capacitance value. In this way an alternating voltage is obtained which represents the output signal of the tachogenerator. One of the two cylinders of such a capacitor should then be arranged so as to be insulated, which can be realized in the simplest way at the stator. In the present embodiment the stator 10 is therefore connected to the thrust bearing 4 via an insulating ring 15, a connection electrode 16 being provided between the stator and the insulating ring, in order to enable an electrically-conducting connection to be made to the stator 10. A second connection electrode 17 is provided between the thrust bearing 4 and the bracket 5, which electrode serves as a ground connection. Via this electrode 17, the thrust bearing 4, the capstan 3, and the flywheel 6, an electrically conductive connection to the rotor is established. Obviously, such a conductive connection to the rotor 9 could alternatively be established directly via a slip-ring contact which co-operates with the rotor 9.

The variation of the capacitance depending on the instantaneous position of the rotor teeth relative to the stator teeth in such a cylindrical capacitive tachogenerator, and thus the amplitude and waveform of the output signal, now depends on how the teeth 13 and 14 on the cylinder surface 11 and the cylinder surface 12 respectively are shaped with respect to the tooth gaps between the teeth. As the output signal of such a tachogenerator should have a maximum amplitude and a sinusoidal waveform, the effective capacitive width of a tooth on one cylinder surface in a tachogenerator in accordance with the invention is made smaller than the effective capacitive width of a toothing gap on the other cylinder surface, as is shown in FIG. 2.

Figure 2:
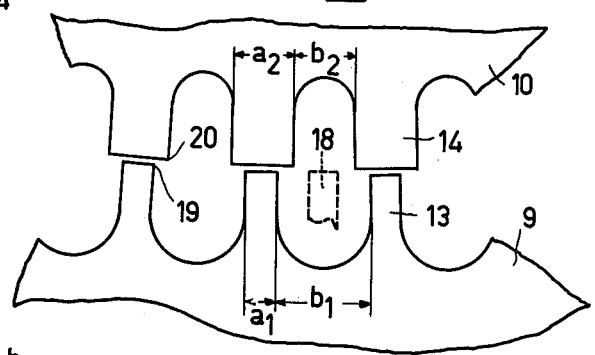
FIG. 2 shows the facing teeth and tooth gaps of the stator and the rotor on an enlarged scale.

In the embodiment shown in FIG. 2 the teeth 13 on the rotor 9 and the teeth 14 on the stator 10 have square edges at their free ends, so that in this case the effective capacitive width of the teeth or tooth gaps corresponds to the total actual width of the teeth or tooth gaps. The width of the teeth 13 on the rotor 9 is designated $a_1$ and the width of an adjacent tooth gap is designated $b_1$. The width of the teeth 14 on the stator 10 is designated $a_2$ and the width of an adjacent tooth gap $b_2$. As can be seen, the width $a_1$ of the teeth 13 on the rotor 9 is smaller than the width $b_2$ of the tooth gap between the teeth 14 on the stator 10. In order to simplify manufacture the bottoms of the tooth gaps in the present embodiment are rounded, so that the cylinder surfaces of the rotor or stator from which the respective teeth 13 or 14 project are constituted by semi-circular portions, which in the present context is irrelevant, because these portions of the tooth gaps have no capacitive effect. The stator 10 and the rotor 9 have equal numbers of teeth, which are uniformly distributed around the circumference, so that they are situated at equal angular distances from each other. The ratio of the width $a_1$ of the teeth 14 on the stator 10 to the width $b_1$ of the adjacent tooth gaps has been selected to be approximately 1:1. Since, as already stated, the width $a_2$ of the teeth 13 on the rotor 9 is smaller than the width $b_2$ of the tooth gaps between the teeth 14 on the stator 10, the teeth 13 on the rotor 9 are thus narrower than the teeth 14 on the stator 10, so that $a_1$ is smaller than $a_2$. It is readily possible to reverse this construction of the teeth and the tooth gaps with respect to the stator and rotor respectively and to make the teeth 13 on the rotor 9 wider than the teeth 14 on the stator 10, because as a result of the uniform distribution of the teeth over the circumference the properties of the tachogenerator will not change. It is merely essential how the teeth and tooth gaps on the stator and on the rotor are shaped.

FIG. 2 shows a position of the rotor 9 relative to the stator 10, in which the teeth on the rotor and stator are situated exactly opposite each other, so that the air gap between them is minimal and thus the capacitance a a maximum. The position in which the capacitance is minimal is reached if the teeth 13 of the rotor 9 are situated exactly opposite the tooth gaps between the teeth 14 on the stator 10, as is indicated for one tooth by the dashed line in FIG. 2. In the intermediate positions between the two aforementioned positions of the rotor relative to the stator, capacitance values are obtained which lie between the two said extreme values. The step of selecting the width $a_1$ of the teeth 13 to be smaller than the width $b_2$ of the tooth gap between the teeth 14 ensures that the maximum and minimum capacitance values of the tachogenerator have substantially different magnitude, because the situation that a tooth bridges the facing tooth gap cannot occur. As a result of this, the output signal of the tachogenerator is large and also has a substantially sinusoidal waveform.

In this respect it is found to be very advantageous if the ratio of the effective capacitive width of a tooth to the effective capacitive width of an adjacent tooth gap is of the order of magnitude of 1:1 on one cylinder surface and lies between 1:2 to 1:4 on the other cylinder surface. Herein, order of magnitude is to be understood to mean deviations from the ratio 1:1, which may be approximately ±40%, so that said ratio may range between 1:1.4 and 1:0.6. Accordingly, the ratio of the effective capacitive width of a tooth to the effective capacitive width of an adjacent tooth gap on the other cylinder surface is selected to be between 1:2 and 1:4, in order to ensure that again an optimum output signal of the tachogenerator is obtained. Suitably, the most favourable conditions are determined by tests. In this respect it is found to be particularly advantageous if the ratio is 1:1±10% on the one cylinder surface and 1:3±10% on the other cylinder surface.

Figure 3:
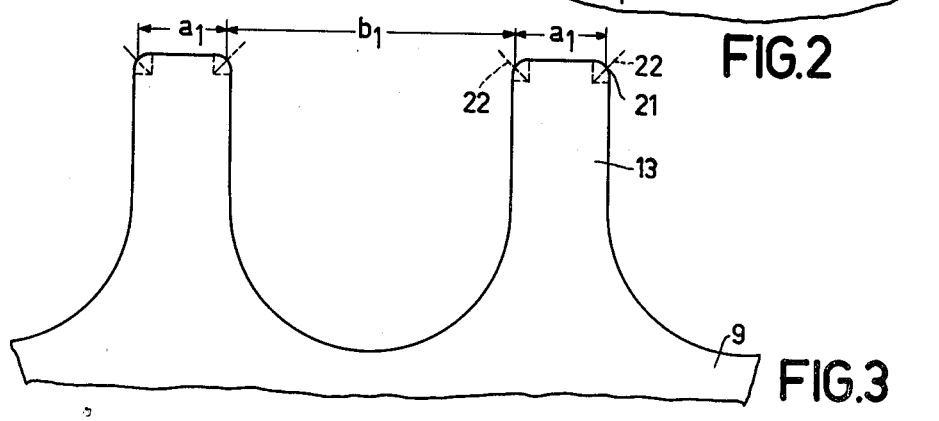
FIG. 3 shows, on a further enlarged scale, teeth whose tooth edges have been rounded.

When manufacturing the rotors and the stators, it is generally difficult to make the tooth edges 19 and 20, which are situated on the free ends of the teeth 13 and 14 respectively, which extend transversely of the direction of movement of the rotor and which also determine the variations of the capacitance values, squareedged. It is therefore advisable either to bevel or round said tooth edges 19 and 20, as is shown in FIG. 3 for the teeth 13 on the rotor 9, which are rounded. These roundings are designated 21 and in this case each consists of a quarter circle. As the free ends of the teeth determine the capacitive behavior of the tachogenerator in respect of the instantaneous effective air gap, such roundings or bevels have a corresponding influence on the capacitance variations depending on the instantaneous position of the rotor teeth relative to the stator teeth. Therefore, such roundings or bevels should be taken into account in selecting the ratio of the width of a tooth to the adjacent tooth gap. This is effected in that a corresponding average value for the width of a tooth and accordingly for the width of the adjacent tooth gap at the same circumferential level is laid down, which is to be regarded as the effective capacitive width and which yields a corresponding average value for the effective air gap between the stator and rotor. As the air gap between the free ends of the teeth of the rotor and the stator is generally selected to be very small, in order to obtain high capacitance values, the changes of the effective capacitive width to be allowed for as a result of the rounding or bevels are very small, because tooth portions which are situated at only a slight distance from the actual air gap no longer have any influence on the capacitive behavior. In the present embodiment in which the tooth edges are rounded by a quarter circle, it may be assumed that at its point of intersection with the rounding 21 the axis 22 of angular symmetry, which extends at 45°, each time defines the effective capacitive width. The same would apply to a 45° bevel.

Hereinafter, numerical data are given for the construction of such a cylindrical capacitive tachogenerator, with which particularly favourable results were obtained. The stator and the rotor are each provided with 132 teeth which are uniformly distributed around the circumference. The diameter of the stator at the circumferential level of the free ends of the teeth is 89.9 mm and that of the rotor 90.5 mm, yielding an air gap of 0.3 mm between the free ends of the teeth. The stator is provided with teeth having an overall width of 1.1 mm, the overall width of the tooth gaps being 1 mm. The tooth edges have been rounded by a quarter circle, whose radius is 0.12 mm. For the stator teeth this yields an effective capacitive width of 1.028 mm, which results in an effective capacitive width for the adjacent tooth gaps of 1.072 mm. For the stator this yields a ratio of the effective capacitive width of a tooth to the effective capacitive width of an adjacent tooth gap of 1:1.04. The teeth of the rotor have an overall width of 0.6 mm and the adjacent tooth gaps an overall width of 1.55 mm. Again the tooth edges have been rounded by a quarter circle whose radius is 0.12 mm. For the rotor teeth this results in an effective capacitive width of 0.53 mm, which yields an effective capacitive width of an adjacent tooth gap of 1.62 mm. Accordingly, the ratio of the effective capacitive width of a tooth to the effective capacitive width of an adjacent tooth gap for the rotor will be 1:3.06. As can be seen, the effective capacitive width of the rotor teeth is then approximately half the effective capacitive width of the tooth gaps between the stator teeth. The height of the teeth, starting from the bottom of the adjacent tooth gap, is then 1.5 mm, but this is irrelevant in the present context.

As is evident from the foregoing numeral data, the teeth of such a tachogenerator are comparatively small. In spite of this they should be constructed very accurately in respect of their dimensions and shape, in order to ensure that the output signal of the tachogenerator does not exhibit any undesired fluctuations, because irregularities in the construction of the teeth directly influence the capacitive behaviour, which in its turn determines the output signal. It is therefore found to be particularly advantageous for such a tachogenerator if the two cylinders of the stator and the rotor with the teeth formed on them are constructed ad plastics parts, because such parts can be manufactured very simply and accurately in plastics technology by injection-molding processes. For the capacitor function of said plastics parts they are provided with an electrically conductive coating, at least at the relevant areas, for example in that a metal coating is deposited by electroplating. Such a coating should at least cover the teeth and tooth gaps and should extend up to the corresponding connection electrode. In this way the teeth and tooth gaps can be manufactured very accurately and simply with the desired ratio of their effective capacitive width. As in the embodiment of FIG. 1 the rotor 9 of the tachogenerator and the flywheel 6 are integral with each other, a lead-oxide loaded plastics material may be employed for this part, in order to ensure that the flywheel has the mass required for stabilizing the speed of revolution of the capstan 3.

What is claimed is:

1. A cylindrical capacitive tachogenerator comprising a rotor part and a stator part, one of said parts being arranged as an inner cylinder and the other part being a hollow outer cylinder coaxially disposed about the one part and defining an air gap between the cylindrical surfaces of said cylinders, said cylinders each having an equal number of respective teeth spaced from each other by tooth gaps and uniformly distributed around the circumference, the ratio of the effective capacitive width of a tooth at its free end to the effective capacitive width of an adjacent tooth gap at the same circumferential level having a predetermined value, characterized in that the effective capacitive width of a tooth on one cylindrical surface is smaller than each of the effective capacitive widths of a tooth and of a tooth gap on the other cylinder surface.

2. A tachogenerator as claimed in claim 1, characterized in that the ratio of the effective capacitive width of a tooth to the effective capacitive width of an adjacent tooth gap is selected to be of the order of magnitude of 1:1 on one cylinder surface and between 1:2 and 1:4 on the other cylinder surface.

3. A tachogenerator as claimed in claim 1, characterized in that the ratio is selected to be 1:1±10% on the one cylinder surface and 1:3±10% on the other cylinder surface.

4. A tachogenerator as claimed in claim 1, 2 or 3, characterized in that the two cylinders with the teeth provided on them take the form of plastics parts, whose surfaces are at least partly provided with an electrically conductive layer.

* * * * *